(12) United States Patent
Baneva et al.

(10) Patent No.: US 11,755,343 B2
(45) Date of Patent: *Sep. 12, 2023

(54) METHODS, SYSTEMS AND APPARATUS TO TRIGGER A WORKFLOW IN A CLOUD COMPUTING ENVIRONMENT

(71) Applicant: VMware, Inc., Palo Alto, CA (US)

(72) Inventors: Ivanka Baneva, Sofia (BG); Boris Savov, Sofia (BG); Rostislav Georgiev, Sofia (BG); Ventsyslav Raikov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,108

(22) Filed: Jun. 7, 2021

(65) Prior Publication Data

US 2021/0294672 A1  Sep. 23, 2021

Related U.S. Application Data

(63) Continuation of application No. 16/780,527, filed on Feb. 3, 2020, now Pat. No. 11,029,977, which is a continuation of application No. 15/371,407, filed on Dec. 7, 2016, now Pat. No. 10,552,180.

(51) Int. Cl.
*G06Q 10/06* (2023.01)
*G06F 9/451* (2018.01)
(Continued)

(52) U.S. Cl.
CPC ........... *G06F 9/451* (2018.02); *G06F 8/31* (2013.01); *G06F 9/5077* (2013.01); *G06F 9/542* (2013.01); *G06Q 10/06311* (2013.01)

(58) Field of Classification Search
CPC .......... G06F 9/451; G06F 8/31; G06F 9/5077; G06F 9/542; G06Q 10/06311
See application file for complete search history.

(56) References Cited

U.S. PATENT DOCUMENTS 7,428,535 B1* 9/2008 Peyton ............... G06F 8/34
707/999.005
7,971,186 B1* 6/2011 Peyton ............... G06F 8/34
717/109

(Continued)

OTHER PUBLICATIONS

United States Patent and Trademark Office, "Non-final Office Action," mailed in connection with U.S. Appl. No. 15/371,474, dated Nov. 13, 2019, 23 pages.

(Continued)

*Primary Examiner* — Hien L Duong
(74) *Attorney, Agent, or Firm* — Hanley, Flight & Zimmerman, LLC

(57) ABSTRACT

Methods, apparatus and articles of manufacture to provide workflow subscription management in a cloud computing environment are disclosed. Examples disclosed herein cause a graphical user interface associated with a virtual appliance to present a template to create a first workflow subscription, the template including (1) a first input element to specify a workflow to be performed, and (2) a second input element to specify an event topic that is to trigger operation of the workflow, the second input element including a field to specify at least one of (i) whether other workflow subscriptions are to be blocked from an event notification associated with the event topic until the first workflow subscription has acted upon the event notification, or (ii) whether a reply notification is to be sent to a service associated with the event notification after the workflow has completed in response to being triggered based on the event notification.

18 Claims, 10 Drawing Sheets

(51) Int. Cl.
G06F 8/30 (2018.01)
G06F 9/54 (2006.01)
G06Q 10/0631 (2023.01)
G06F 9/50 (2006.01)

(56) References Cited

U.S. PATENT DOCUMENTS

| | | | |
|---|---|---|---|
| 8,171,482 | B1 | 5/2012 | Maovic et al. |
| 8,171,485 | B2 | 5/2012 | Muller |
| 8,788,525 | B2 | 7/2014 | Neels et al. |
| 9,438,599 | B1 | 9/2016 | Yuhan |
| 10,152,356 | B2 | 12/2018 | Raikov et al. |
| 10,282,689 | B1* | 5/2019 | Johnston ............. G06Q 10/103 |
| 10,326,845 | B1* | 6/2019 | Jaeger ................. H04L 41/022 |
| 10,353,752 | B2 | 7/2019 | Savov et al. |
| 10,552,180 | B2 | 2/2020 | Baneva et al. |
| 10,628,232 | B2 | 4/2020 | Raikov et al. |
| 10,951,540 | B1* | 3/2021 | De Kadt .............. H04L 47/787 |
| 11,029,977 | B2 | 6/2021 | Baneva et al. |
| 11,263,058 | B2 | 3/2022 | Raikov et al. |
| 2007/0240046 | A1 | 10/2007 | Yan et al. |
| 2008/0320441 | A1 | 12/2008 | Ahadian et al. |
| 2010/0023952 | A1 | 1/2010 | Sandoval et al. |
| 2011/0265020 | A1 | 10/2011 | Fields et al. |
| 2012/0089723 | A1 | 4/2012 | Mercuri |
| 2012/0102170 | A1 | 4/2012 | Hiltunen et al. |
| 2012/0110572 | A1* | 5/2012 | Kodi ................. G06F 9/45558 718/1 |
| 2012/0144391 | A1 | 6/2012 | Ueda |
| 2012/0198457 | A1 | 8/2012 | Leonelli et al. |
| 2012/0221728 | A1 | 8/2012 | Dubbels et al. |
| 2012/0254291 | A1 | 10/2012 | Feldman et al. |
| 2012/0303630 | A1 | 11/2012 | Gelfand |
| 2013/0232480 | A1 | 9/2013 | Winterfeldt et al. |
| 2013/0263209 | A1 | 10/2013 | Panuganty |
| 2013/0304788 | A1 | 11/2013 | DeLuca et al. |
| 2014/0075027 | A1 | 3/2014 | Chatterjee et al. |
| 2014/0129698 | A1 | 5/2014 | Seago et al. |
| 2014/0181816 | A1 | 6/2014 | Muller et al. |
| 2014/0279201 | A1 | 9/2014 | Iyoob et al. |
| 2015/0089511 | A1 | 3/2015 | Smith et al. |
| 2015/0186132 | A1 | 7/2015 | Oliveri et al. |
| 2016/0019636 | A1 | 1/2016 | Adapalli et al. |
| 2016/0103717 | A1 | 4/2016 | Dettori et al. |
| 2016/0173524 | A1* | 6/2016 | Lietz .................... G06F 21/577 726/25 |
| 2016/0277536 | A1* | 9/2016 | Barry ................... H04L 67/535 |
| 2017/0039521 | A1 | 2/2017 | Henke et al. |
| 2017/0048276 | A1 | 2/2017 | Bailey et al. |
| 2017/0060977 | A1 | 3/2017 | Pan et al. |
| 2017/0083292 | A1 | 3/2017 | McLaughlan et al. |
| 2017/0139746 | A1 | 5/2017 | Maier et al. |
| 2017/0147296 | A1 | 5/2017 | Kumar et al. |
| 2017/0187782 | A1 | 6/2017 | Crawford et al. |
| 2017/0277516 | A1* | 9/2017 | Grebnov ............... G06F 9/5038 |
| 2017/0308359 | A1* | 10/2017 | Singh .................... G06F 8/22 |
| 2017/0344921 | A1 | 11/2017 | Leonelli et al. |
| 2018/0032241 | A1 | 2/2018 | Ghosh et al. |
| 2018/0157384 | A1 | 6/2018 | Baneva et al. |
| 2018/0157512 | A1 | 6/2018 | Savov et al. |
| 2018/0157538 | A1 | 6/2018 | Raikov et al. |
| 2018/0157542 | A1 | 6/2018 | Savov et al. |
| 2019/0188048 | A1 | 6/2019 | Raikov et al. |
| 2019/0342143 | A1 | 11/2019 | Lin |
| 2020/0174806 | A1 | 6/2020 | Baneva et al. |

OTHER PUBLICATIONS

United States Patent and Trademark Office, "Notice of Allowance," mailed in connection with U.S. Appl. No. 15/371,545, dated Mar. 1, 2019, 12 pages.

United States Patent and Trademark Office, "Final Office Action," mailed in connection with U.S. Appl. No. 15/371,474, dated May 2, 2019, 23 pages.

United States Patent and Trademark Office, "Non-final Office Action," mailed in connection with U.S. Appl. No. 15/371,474, dated Oct. 18, 2018, 18 pages.

United States Patent and Trademark Office, "Notice of Allowance," mailed in connection with U.S. Appl. No. 15/371,450, dated Jul. 30, 2018, 5 pages.

Bijjahalli, "vRealize Automation 7.0—New Event Broker Enhances Lifecycle Extensibility," Nov. 2, 2015, 7 pages.

United States Patent and Trademark Office, "Non-final Office Action," mailed in connection with U.S. Appl. No. 15/371,450, dated Mar. 30, 2018, 8 pages.

United States Patent and Trademark Office, "Non-final Office Action," mailed in connection with U.S. Appl. No. 15/371,545, dated Sep. 19, 2018, 20 pages.

United States Patent and Trademark Office, "Notice of Allowability," mailed in connection with U.S. Appl. No. 15/371,407, dated Jan. 8, 2020, 2 pages.

United States Patent and Trademark Office, "Notice of Allowance," mailed in connection with U.S. Appl. No. 15/371,407, dated Sep. 17, 2019, 10 pages.

United States Patent and Trademark Office, "Final Office Action," mailed in connection with U.S. Appl. No. 15/371,407, dated Jun. 6, 2019, 9 pages.

United States Patent and Trademark Office, "Non-final Office Action," mailed in connection with U.S. Appl. No. 15/371,407, dated Nov. 29, 2018, 2018, 15 pages.

United States Patent and Trademark Office, "Final Office Action," mailed in connection with U.S. Appl. No. 15/371,474, dated Jun. 5, 2020, 24 pages.

United States Patent and Trademark Office, "Final Office Action," mailed in connection with U.S. Appl. No. 16/208,498, dated Sep. 20, 2019, 5 pages.

United States Patent and Trademark Office, "Notice of Allowance," mailed in connection with U.S. Appl. No. 16/208,498, dated Dec. 16, 2019, 5 pages.

United States Patent and Trademark Office, "Corrected Notice of Allowability," mailed in connection with U.S. Appl. No. 15/371,450, dated Nov. 7, 2018, 3 pages.

United States Patent and Trademark Office, "Non-final Office Action," mailed in connection with U.S. Appl. No. 16/208,498, dated Jun. 3, 2019, 6 pages.

United States Patent and Trademark Office, "Non-final Office Action," mailed in connection with U.S. Appl. No. 15/371,474, dated Mar. 26, 2021, 25 pages.

United States Patent and Trademark Office, "Notice of Allowance," mailed in connection with U.S. Appl. No. 16/780,527, dated Jan. 27, 2021, 9 pages.

United States Patent and Trademark Office, "Non-final Office Action," mailed in connection with U.S. Appl. No. 16/780,527, dated Oct. 1, 2020, 8 pages.

"Overview: Simple Tasks in Workflow," May 19, 2014, 8 pages. Retrieved from https://hi.service-now.com/kb_view.do?sysparm_article=KB0538588.

United States Patent and Trademark Office, "Notice of Allowance," mailed in connection with U.S. Appl. No. 15/371,474, dated Jun. 20, 2022, 18 pages.

United States Patent and Trademark Office, "Non-Final Office Action," mailed in connection with U.S. Appl. No. 16/853,721, dated Mar. 18, 2021, 5 pages.

United States Patent and Trademark Office, "Notice of Allowance," mailed in connection with U.S. Appl. No. 16/853,721, dated Oct. 26, 2021, 5 pages.

United States Patent and Trademark Office, "Notice of Allowance," mailed in connection with U.S. Appl. No. 16/853,721, dated Jul. 13, 2021, 5 pages.

* cited by examiner

METHODS, SYSTEMS AND APPARATUS TO TRIGGER A WORKFLOW IN A CLOUD COMPUTING ENVIRONMENT

RELATED APPLICATION(S)

This patent arises from a continuation of U.S. patent application Ser. No. 16/780,527 (now U.S. Pat. No. 11,029, 977), which is entitled "METHODS, SYSTEMS AND APPARATUS TO TRIGGER A WORKFLOW IN A CLOUD COMPUTING ENVIRONMENT," and which was filed on Feb. 3, 2020, which is a continuation of U.S. patent application Ser. No. 15/371,407 (now U.S. Pat. No. 10,552, 180), which is entitled "METHODS, SYSTEMS AND APPARATUS TO TRIGGER A WORKFLOW IN A CLOUD COMPUTING ENVIRONMENT," and which was filed on Dec. 7, 2016. Priority to U.S. patent application Ser. No. 16/780,527 and U.S. patent application Ser. No. 15/371, 407 is hereby expressly claimed. U.S. patent application Ser. No. 16/780,527 and U.S. patent application Ser. No. 15/371, 407 are hereby incorporated by reference herein in their respective entireties.

FIELD OF THE DISCLOSURE

The present disclosure relates generally to cloud computing and, more particularly, to triggering workflow(s) in a cloud computing environment.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
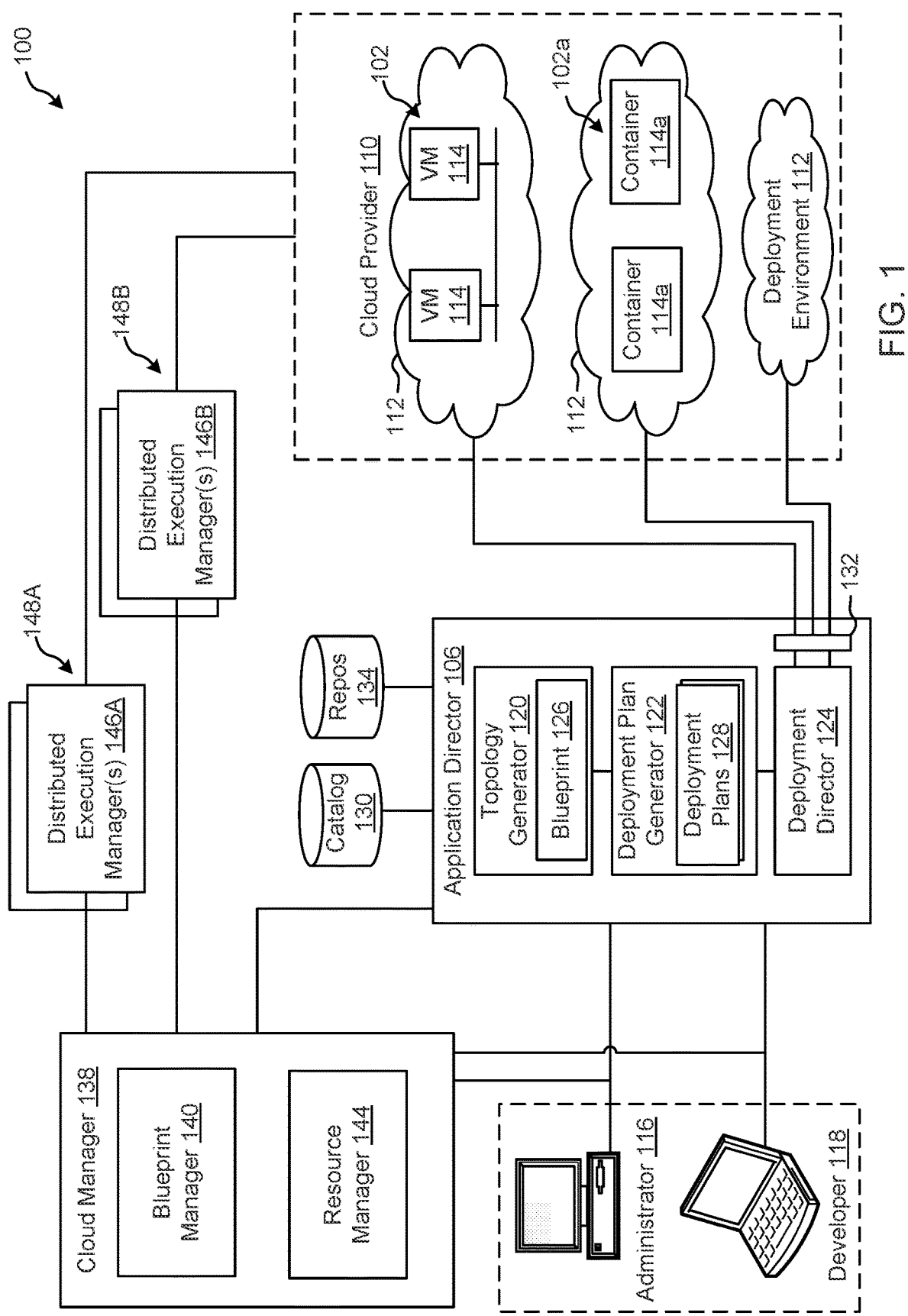
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their respective entireties.

Cloud computing platforms may provide many powerful capabilities for performing computing operations. However, taking advantage of these computing capabilities manually may be complex and/or require significant training and/or expertise. Prior techniques to provide cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

Example methods and apparatus disclosed herein provide for automation of management tasks, such as provisioning multiple virtual machines for a multiple-machine computing system (e.g., a group of servers that inter-operate), linking provisioned virtual machines and tasks to desired systems to execute those virtual machines or tasks, reclaiming cloud computing resources that are no longer in use, and/or workflow subscription management, etc. The improvements to cloud management systems (e.g., the vCloud Automation Center (vCAC) from VMware®, the vRealize Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Workflow Management

Prior workflow management systems executed in cloud environments are usually limited to executing a defined set of workflows related to performing a variety of tasks such as provisioning virtual machines. However, customers of cloud computing platforms and services may want to extend the workflows performed in the cloud environment and/or have greater control over how and when such workflows are performed. However, extending workflows and/or controlling how/when such workflows are executed in existing cloud computing platforms is typically performed manually by a system administrator having specialized knowledge of the operations of such workflows. In order to amend the operations of the workflows (e.g., customize the workflow), the system administrator must revise the code representing the workflow and/or identify workflow stubs at which additional workflow tasks can be attached to an existing workflow. Further, in order to remove such additional workflow tasks at a later time, the system administrator must review the workflow code and remove all additional tasks added thereto. Often, a tenant administrator lacks the specialized knowledge and/or the confidence to make such changes. In view of the above-mentioned limitations of prior workflow management systems, such prior systems tend to be difficult to revise and, therefore, inflexible.

Unlike such prior systems, example cloud management systems (e.g., such as the vRealize Automation Cloud Automation Software from VMware®) having the workflow management system disclosed herein provide the tenant administrator with the ability to trigger the operation of a custom or non-custom workflow based on a system generated event and further based on a user-specified condition. Further, the tenant administrator can easily prevent the workflow from triggering at any time by selecting an inactivation feature available on a display. A graphical user interface disclosed herein supplies a display by which a tenant administrator can select (or specify) a workflow, select a system-generated event and specify a condition related to the event to thereby form a workflow subscription. Based on the event and the specified condition, the selected/specified workflow is triggered.

Disclosed herein is an example virtual appliance in a cloud computing environment that includes a graphical user interface that responds to a user-selected event topic by causing a corresponding event schema to be displayed, and that also includes a subscription manager to trigger a workflow based on an event notification corresponding to the event topic and based on a condition corresponding to the event schema being satisfied. In some disclosed examples, the event schema includes schema fields and the graphical user interface responds to selection of a first one of the schema fields by generating an input field by which a user can enter a threshold value. In further disclosed examples, the graphical user interface supplies the threshold value to the subscription manager and the subscription manager determines whether the condition has been satisfied based on the threshold value. In yet further examples, the subscription manager includes a comparator that compares the threshold value to a payload value collected from an event payload included in the event notification and the payload value is associated with the field of interest. In still further examples, the subscription manager determines, based on the comparison, whether the payload value bears a specific relationship to the threshold value. In some examples, the graphical user interface generates a display including a list of workflows, and a list of event topics and the graphical user interface collects a workflow identifier corresponding to a user-selected one of the workflows and collects an event topic identifier corresponding to the user-selected event topic. The subscription manager subscribes to an event broker to receive the event notification corresponding to the event topic.

Example methods for triggering a workflow are disclosed herein. Some example methods include, causing, by executing an instruction with at least one processor, an event schema to be displayed in response to a first input identifying an event topic that corresponds to the event schema. Disclosed example methods further include accessing a second input identifying a field included in the event topic schema and a third input identifying a threshold value corresponding to the field and, in response to an event notification corresponding to the event topic and based on the threshold value having a defined relationship to a payload value included in an event payload contained in the event notification, triggering a workflow, by executing an instruction with at least one processor. Example methods also include examining the event payload to identify the field and to identify the payload value contained in the field, and, evaluating an actual relationship between the payload value and the threshold value, to determine if the actual relationship satisfies the defined relationship. Further example methods include registering to receive the event notification when an event related to the event topic occurs. In some example methods, the event topic includes provisioning a virtual machine. Still further disclosed example methods include accepting a fourth input identifying the defined relationship. In still further example methods, the defined relationship is at least one of: 1) the payload value being equal to the threshold value, 2) the payload value being greater than the threshold value, and 3) the payload value being less than the threshold value. Still further example methods include assigning a subscription identifier to at least one of the event topic, the field and the threshold value, and storing the subscription identifier, the event topic, the field and the threshold value as a workflow subscription. Yet other example methods include in response to an activation input, activating the workflow subscription, wherein activating the workflow subscription causes an event broker to send the event notification corresponding to the event topic to a subscription manager when an event corresponding to the event topic occurs. The subscription manager performs the triggering of the workflow, in response to the event notification corresponding to the event topic and based on the threshold value having a defined relationship to a payload value included in the event payload contained in the event notification.

Also disclosed herein are example instructions to cause a processor to cause a corresponding event schema to be displayed in response to a first input identifying an event topic, to access a second input identifying a field included in the event topic schema and a third input identifying a threshold value corresponding to the field, and, based on receiving an event notification corresponding to the event topic and based on the threshold value having a defined relationship to a payload value included in an event payload contained in the event notification, to trigger a workflow.

Further example instructions cause the processor to identify the field in the event payload and identify the payload value contained in the field, and, evaluate an actual relationship between the payload value and the threshold value, to determine if the actual relationship satisfies the defined relationship. Example disclosed instructions further cause the processor to register to receive the event notification when an event (generated by a service) related to the event topic occurs. In some examples, the event topic includes provisioning a virtual machine. Further disclosed instructions cause the processor to accept a fourth input identifying the defined relationship. The defined relationship can be at least one of: 1) the payload value being equal to the threshold value, 2) the payload value being greater than the threshold value, and 3) the payload value being less than the threshold value.

These and other example methods, apparatus, systems and articles of manufacture (e.g., physical storage media) to implement a workflow triggering subscription in a cloud computing environment are disclosed in further detail below Illustrated Examples FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
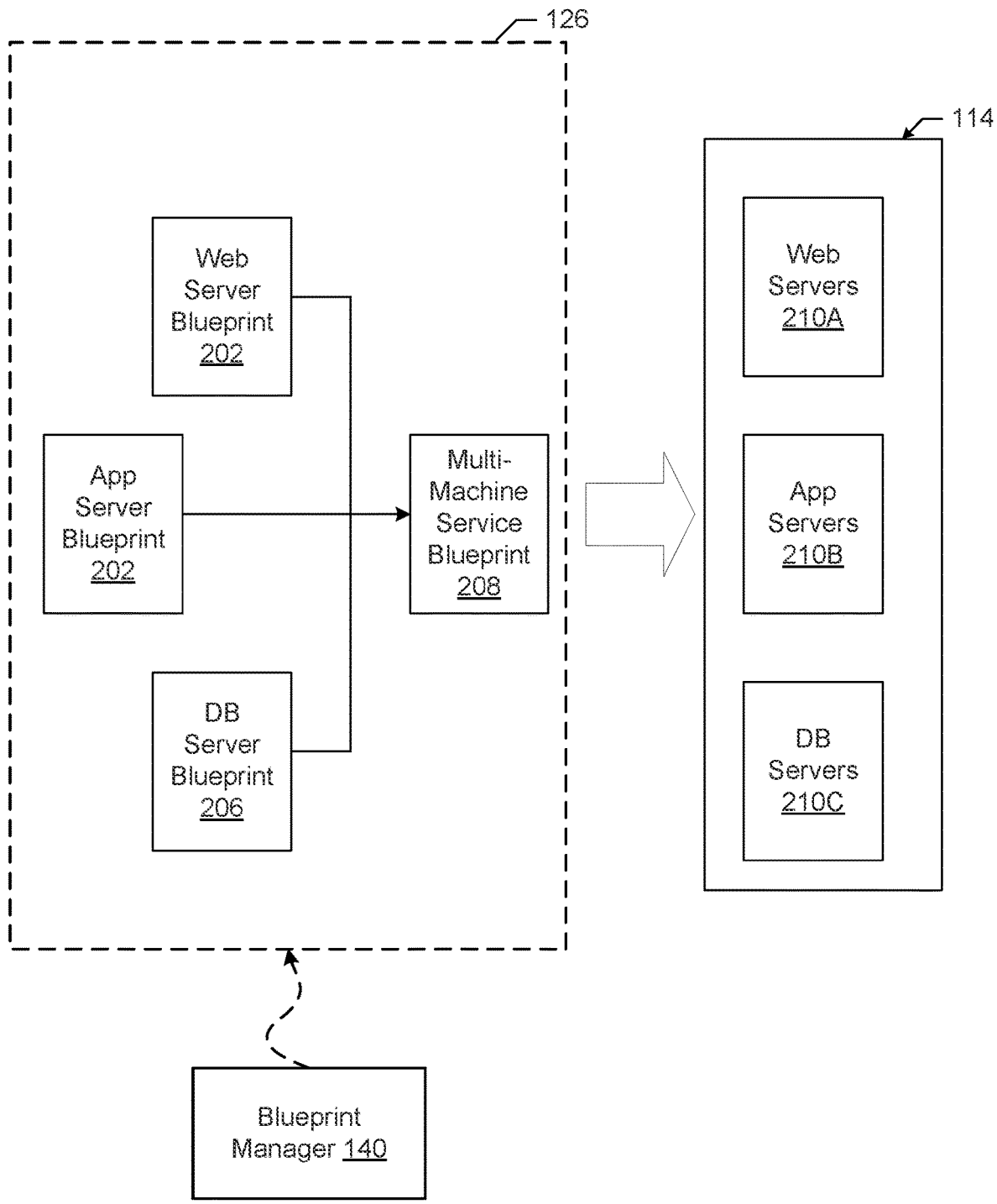
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premises virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
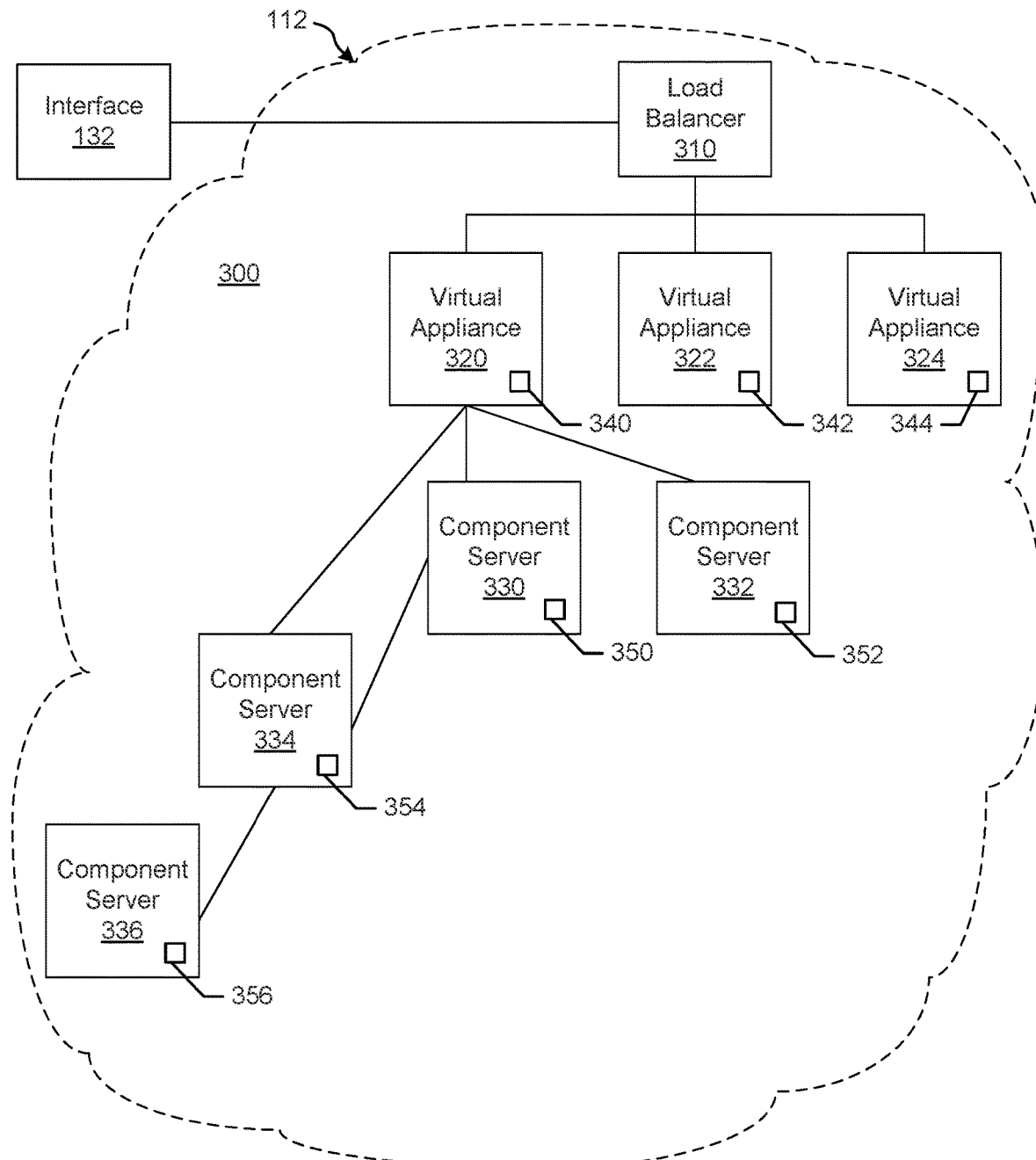
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114*a*) and associated virtualized servers acting as hosts for deployment of component servers (e.g., Web server, application server, database server, etc.) for a customer. The vAs can be deployed as an automation tool, for example, used to deliver VMs and associated applications for on-premises automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114*a*. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114*a* that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
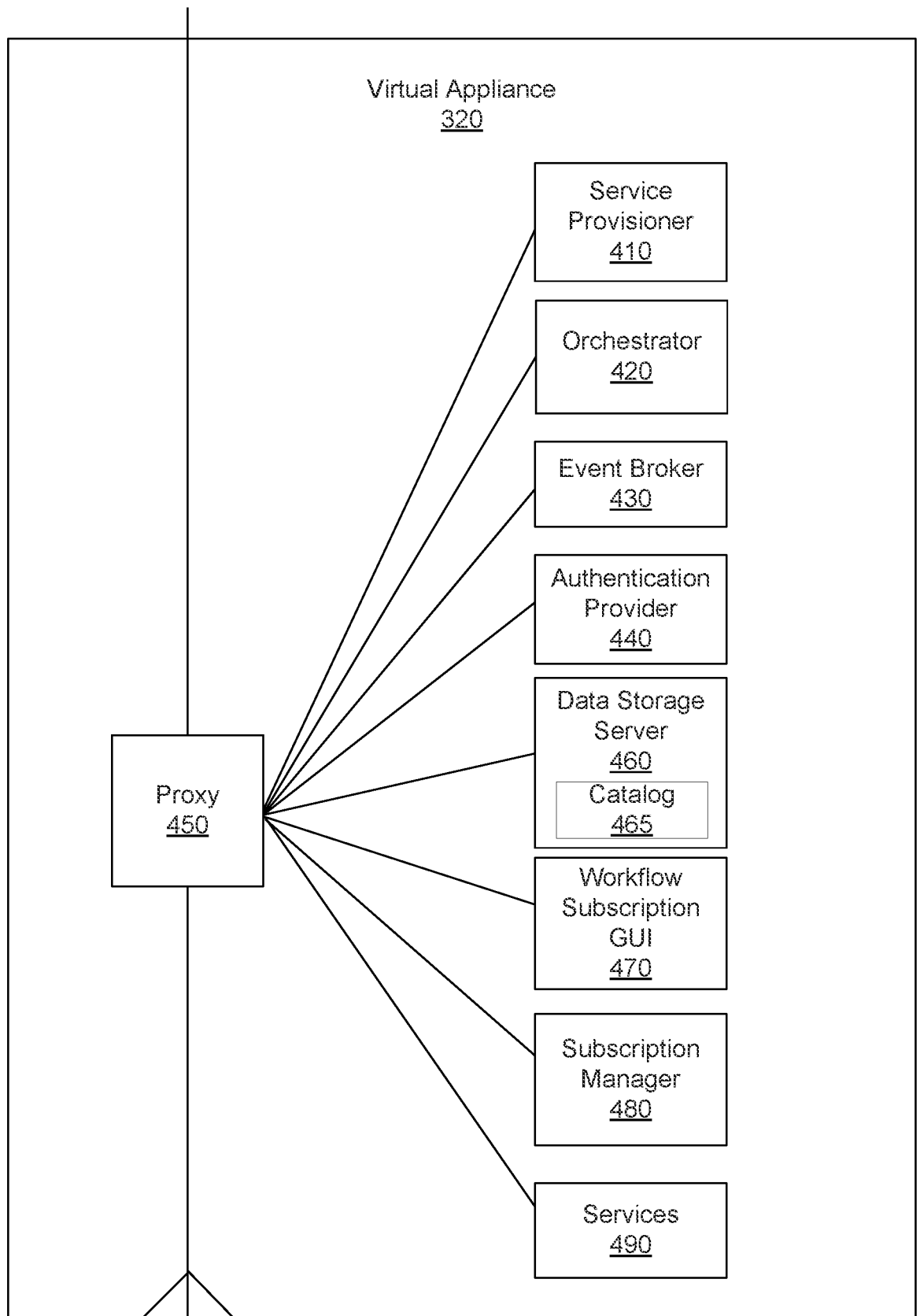
FIG. 4 illustrates an example implementation of a virtual appliance capable of providing workflow subscription management in accordance with the teachings of this disclosure.

FIG. 4 illustrates an example implementation of the vA 320. In the example of FIG. 4, the vA 320 includes an example service provisioner 410, an example orchestrator 420, an example event broker 430, an example authentication provider 440, an example internal reverse proxy 450, an example data storage 460, an example catalog 465, an example workflow subscription graphical user interface (GUI) 470, an example subscription manager 480, and example services 490. The components 410, 420, 430, 440, 450, 460, 470, 480, 490 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the orchestrator 420 can be used to invoke a blueprint to provision a manager for services. In some examples, the orchestrator 420 includes a library of workflows that can be selected for execution.

Example services 490 can include catalog services, identity services, component registry services, approval services, resource management services, event broker services, IaaS, XaaS ("Anything-as-a-Service"), etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The approval services provide a method by which a request to provision a virtual machine (or service) can be approved by a system administrator(s). The resource management services can control the leasing, expiration and reclamation of managed resources. The event broker 430 provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between the services 190 and the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

The example vA 320 of FIG. 4 further includes the example workflow subscription GUI 470, that, in combination with the example services 490, the example event broker 430, the example subscription manager 480, and the example orchestrator 420, implement an example workflow subscription service to enable the extensibility of provisioning workflows in accordance with the teachings of this disclosure. In other words, the workflow subscription service enables the provisioning workflows to be easily extended to include additional tasks. The example workflow subscription service implemented by the vA 320 enables a customer, such as the tenant administrator 116, or any other authorized user, to control when provisioning workflows (or workflow related to provisioning activities) are performed based on events reported by any of the services 490 to the event broker 430. In some examples, as disclosed further herein, the workflow subscription service further allows the tenant administrator to control when workflows are performed based on events coupled with user-specified conditions.

Figure 5A:
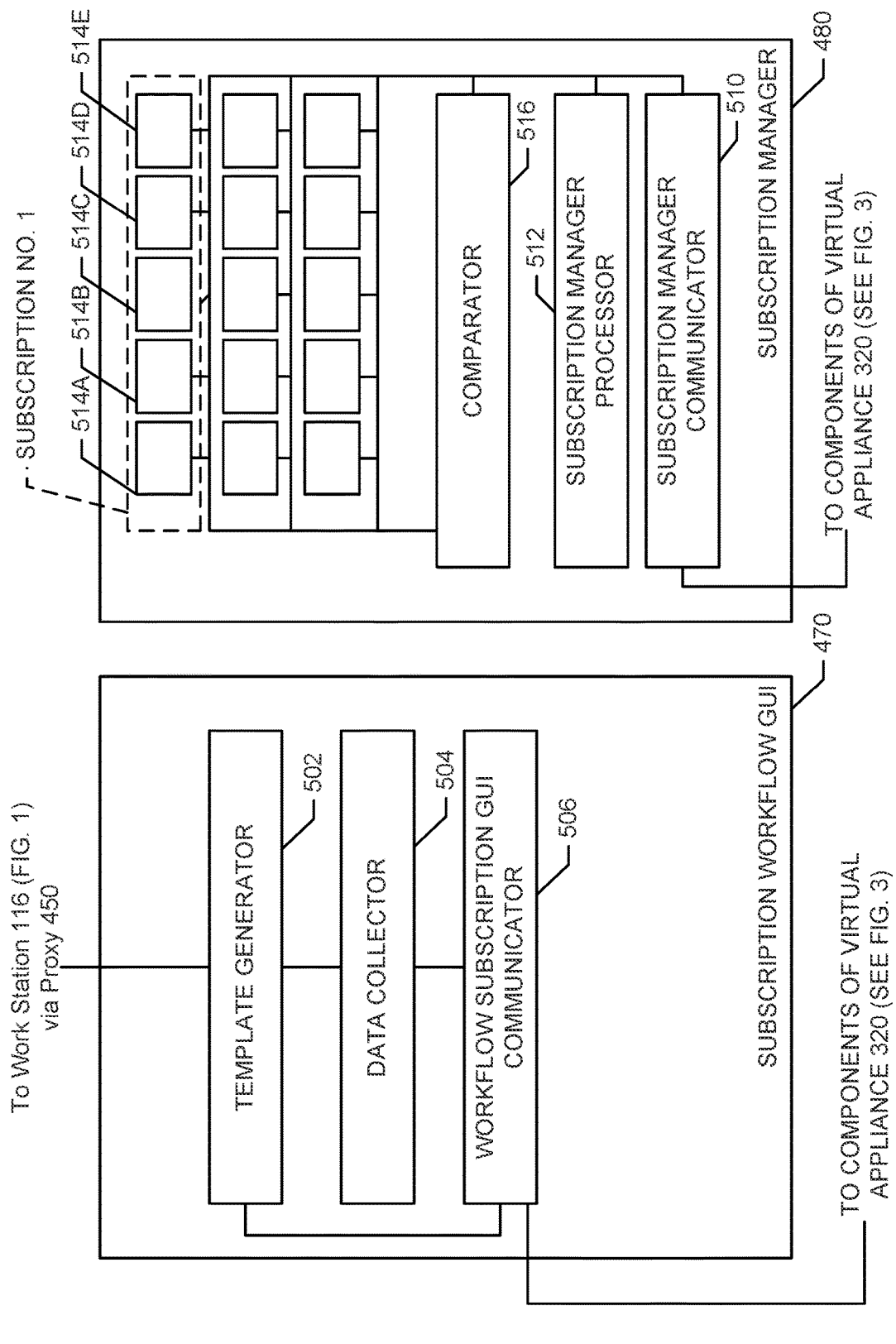
FIG. 5A is a block diagram of an example implementation of the subscription manager and an example workflow subscription graphical user interface of the virtual appliance illustrated in FIG. 4.

An example implementation of the workflow subscription GUI 470 and the example subscription manager 480 is shown in FIG. 5A. In the illustrated example of FIG. 5A, the example workflow subscription GUI 470 includes an example template generator 502 to generate a displayable user-viewable template implemented, for example, in a webpage format (or any other desired format) that allows the tenant administrator to create a "workflow subscription." In some examples, the tenant administrator creates the workflow subscription by entering information into the template and/or selecting information presented by the template. The workflow subscription is created by, for example, specifying a workflow to be performed, an event that is to be used, in part, to trigger the operation of the workflow, and one or more conditions to be evaluated against a desired value before the workflow begins operating. The template generator 502 supplies the template to any screen, display or monitor such as the monitor associated with the tenant administrator work station 116 for presentation thereat. In some examples, the tenant administrator begins by selecting a check box or a radial button (or any other selectable icon) on the template to indicate that a workflow subscription is to be created. In some examples, in response to receiving the subscription selection from the tenant administrator work station 116, the template generator 502 causes the template to display a list of selectable workflows. In some such examples, the workflow subscription GUI 470 can obtain the list of selectable workflows from the example data storage 460, from the example orchestrator 420, (or from any storage device) via, an example workflow subscription GUI communicator 506. The workflow subscription GUI communicator 506 can be communicably coupled to, for example, the data storage 460, the event broker 430, the example subscription manager 480, the orchestrator 420, etc. In some examples, in lieu of providing a list of selectable workflows, the template generated by the template generator 502 provides a text box (or any other input field) into which the tenant administrator can enter an executable script that, when executed, performs a workflow.

In some examples, the template generator 502 includes a list of user-selectable event topics in the template. A selected event topic may be used to trigger the operation of the workflow entered or selected by the tenant administrator. In some examples, the user-selectable event topics are associated with (and/or) generated by one or more of the example services 490 and are reported by one or more of the services 490 to the example event broker 430. As used herein, an event topic describes a set of events having a same logical intent and a same structure. Every event is an instance of an event topic. Further an event topic is a type of event message that is sent to the event broker 430 by one or more of the services 490. An event can indicate a change in the state of one of the services 490 that produces the event (or any of the entities managed by any such one of the services 490). An event is an informational element (or data structure) in which information about an event occurrence is recorded. An event notification or message transports information about the event between the various services 490 and the event broker 430 and between the event broker 430 and the subscription manager 480. In some examples, the list of user-selectable event topics is stored in the data storage 460 and accessed by the workflow subscription GUI 470 using the workflow subscription GUI communicator 506 for display via the template.

In some examples, the user-selectable event topics include a post approval event topic, a pre-approval event topic, an event log default event topic, a blueprint configuration event topic, a resource reclamation event topic, a business group configuration event topic, an orchestration server configuration event topic, a machine lifecycle event topic, a machine provisioning event topic, etc. The post approval and pre-approval event topics are associated with the approval service and can be used to trigger workflows associated with obtaining enterprise approvals for an operation. (For example, if a user would like to provision a new virtual machine, the pre-approval event topic may be used to generate a workflow that will require a set of administrative approvals be obtained before the virtual machine is provisioned.) The event log default event topic represents the addition of an entry in an event log and can be generated by an event log service. The event log can be a recordation of any of a set of occurrences/operations performed by any of the components of the vA 320. The blueprint configuration event topic can be associated with the creation, deletion or updating of a blueprint configuration and can be generated by a composition service. The resource reclamation completion event can represent a resource lease expiring and reclamation of the resource subject to the expired lease. The resource reclamation completion event can be generated by a resource management service. The business group configuration event topic can represent a business group being created, updated or deleted and can be generated by an identity service. The orchestration server configuration (XaaS) event topic can represent an orchestrator server configuration being created, updated, deleted or modified and can be generated by an advanced-designer service. The machine lifecycle event topic can represent an IaaS action being run on a provisioned machine and can be generated by an IaaS service. The machine provisioning event topic can represent an IaaS machine in the process of being provisioned and can be generated by an IaaS service.

In some examples, the user-selectable event topics displayed via the template includes an event topic identifier, an event name, an event description, a service name that identifies the service associated with generating and/or producing the event, a blockable field indicating whether the event topic is blockable such that one or more other subscriptions will (or will not) be blocked from event notification until a hierarchically dominant subscription has been notified and/or taken action based on the event topic, a replyable field indicating whether the event topic is replyable such that the workflow subscription can generate a reply notification to be sent to the service that generated the event when the workflow finishes, and an event schema that describes the structure of the event's payload.

In addition, the example template generator 502 includes a list of user-selectable conditions in the template. In some examples, the user-selectable conditions are related to the event topic that has been selected to trigger (at least in part) the workflow. In some such examples, the template generator 502 further causes the template to include an event schema associated with the event topic selected by the tenant administrator. The event schema identifies a set of fields. For example, if the event topic is a machine life cycle event topic, then the fields of the event schema will be related to the blueprints and machines of the machine life cycle. In contrast, if the event topic is related to an approval event topic, the data fields of the event schema will be related to approval policies. In some examples, the template also includes a text box into which the tenant administrator can enter a path (e.g., a link, an address to a folder in a file system, etc.) to conditions that are not included in the fields of the schema.

Figure 5B:
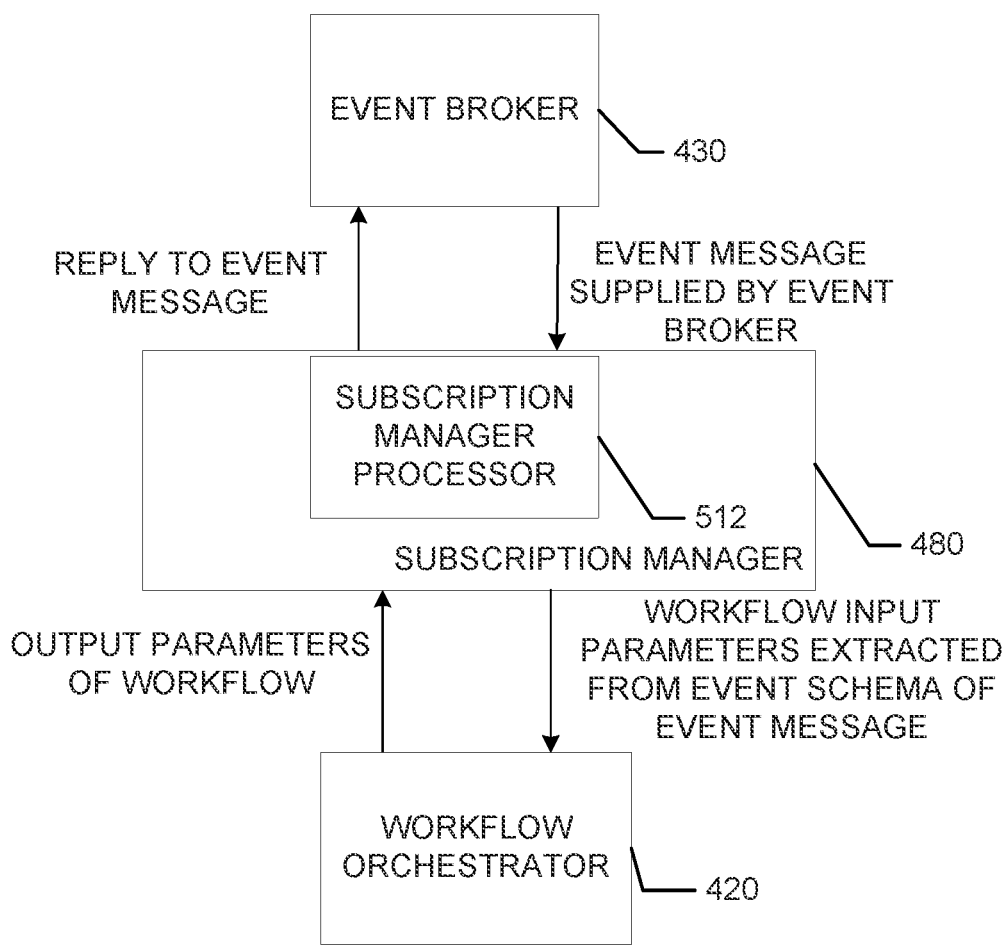
FIG. 5B is a block diagram illustrating an example exchange of information between the example subscription manager of FIG. 5A, an example event broker of FIG. 4, and an example orchestrator also shown in FIG. 4.

A block diagram illustrating an example exchange of information between the example subscription manager 480, the example event broker 430 and the example orchestrator 420 is shown in FIG. 5B. Although not shown in FIG. 5B, all communication to the example subscription manager 480 is received at the subscription manager communicator 510 for subsequent transmission to the example subscription manager processor 512 and information transmitted out of the subscription manager 480 is transmitted via the example subscription manager communicator 510. As described above, each event topic has an associated event schema. In some examples, when creating a workflow script to be executed in connection with a subscription, the tenant administrator configures the workflow script to include input parameters (or a single input parameter) that use/consume all (or some) of the data contained in the data fields of the event payload/schema. The name and type of such input parameters are defined to match the name and type specified in the event schema. In some such examples, the subscription manager processor 512 (see FIG. 5A) of the subscription manager 480 extracts the event schema from the event message and supplies the extracted event schema as input parameters to the orchestrator 420 for use in executing the custom workflow script. In addition, the custom workflow script can be configured to generate output parameters that match a desired schema. Thus, the generated output parameters that result from executing the custom workflow script are supplied by the orchestrator 420 to the subscription manager processor 512 of the subscription manager 480 after the custom workflow script is executed and the subscription manager processor 512 includes the output parameters in a reply message transmitted back to the event broker 430 for subsequent usage by other workflow subscriptions and/or for use by the service that produced the event that triggered the workflow. It should be understood that in addition to the input parameters, the subscription manager 480 supplies a workflow identifier and any other information needed by the orchestrator to execute the custom workflow script.

In some examples, the tenant administrator can use the template to select one (or more) of the fields in the event schema and to indicate a desired value against which a value stored in the field is to be evaluated. In some examples, as disclosed further below, when the value stored in the selected field evaluates to (is equal to, greater than, less than, etc.) the desired value (e.g., True, False, a numerical value, etc.), the workflow is triggered. Thus, the field and the desired value together form a condition to be met and/or satisfied before the selected workflow is triggered. In some examples, the user-selectable conditions (in addition to including the event schema fields) also includes conditions that are more-generally related to the event topic (e.g., an event type, an event timestamp, a user name) and that are to be evaluated to determine whether the workflow will be triggered. Thus, the tenant administrator uses the template generated by the template generator 502 to identify the features/characteristics of the subscription (e.g., the workflow to be performed, an event topic upon which the operation of the workflow is to be predicated/based, and a condition and associated value to be met and/or satisfied before the workflow will be triggered/executed).

In some examples, the subscription information entered using the example template generator 502 of the workflow subscription GUI 470 is supplied to an example data collector 504. The data collector 504 assigns the subscription information a subscription number or subscription identifier and transmits the subscription information and the subscription identifier to the workflow subscription GUI communicator 506 for transmission to (and storage in) the example data storage 460 (or in any other storage device). Initially, the subscription represented by the subscription information and the subscription identifier is "inactive." An inactive subscription is a subscription that does not result in triggering of any workflows and/or monitoring of any events.

In some examples, the template created by the template generator 502 also includes a field by which the tenant administrator can elect to make the subscription active. Activation of the subscription, (which can be performed by changing a value stored in the field, selecting a checkbox, a drop down menu item, a radial button, etc.) causes the data collector 504 to instruct the workflow subscription GUI communicator 506 to mark the subscription information corresponding to the subscription identifier that is stored in the example data storage 460 as "active." In some examples, in response to activation of the subscription, the data collector 504 also causes the workflow subscription GUI communicator 506 to send a notice to the example subscription manager 480. The notice to the subscription manager 480 can include the subscription identifier and information specifying that the subscription is active. In addition, the notice transmitted to the subscription manager can include a storage address at which the subscription information is stored in the data storage 460. In some examples, the subscription information and the subscription identifier are transmitted by the workflow subscription GUI communicator 506 to the subscription manager 480 and the subscription manager 480 causes the subscription information and subscription identifier to be stored in the data storage 460 and/or to be stored at the subscription manager 480 as described in the following paragraph.

Referring still to FIG. 5A, the subscription identifier and the corresponding subscription information (which can include a workflow identifier identifying the workflow to be triggered in connection with the subscription, the event topic of interest, the condition to be evaluated, the threshold value against which the condition is to be evaluated, an operator indicating the type of evaluation to be undertaken, and the status of the subscription (e.g., active/inactive)) delivered to the example subscription manager 480 is received at an example subscription manager communicator 510 of the subscription manager 480. In some examples, the subscription communicator 510 causes the subscription information to be stored in an example set of registers 514 including a first register 514A, a second register 514B, a third register 514C, a fourth register 514D, and a fifth register 514E. In some examples, the first register 514A is used to store an activation flag/bit. If the activation flag/bit is set, the subscription is active. The second register 514B can be used to store the subscription identifier. The third register 514C can be used to store the event topic of interest. The fourth register 514D can be used to store the condition of interest and the fifth register 514E can be used to store the threshold value against which the condition is to be evaluated. In some examples, the threshold value stored in the fifth register 514E also includes an operator indicating the type of evaluation to be performed by the example comparator 516. The operator may indicate that a value associated with the condition is to be equivalent to the threshold value, to be greater than the threshold value, to be less than the threshold value, or any combination thereof (e.g., greater than or equal to, less than or equal to, etc.) etc. If the flag/bit stored in the first register 514A indicates that the subscription is active, an example subscription manager processor 512 causes the information identifying the event topic of interest (stored in the third register 514C) to be transmitted to the example event broker 430 via the subscription manager communicator 510. The event broker 430 responds by adding the event topic of interest to a list of event topics to monitor and further associates the event topic of interest with the subscription manager 480. Thereafter, if an event (event message) corresponding to the event topic of interest is received at the event broker 430, the event broker 430 causes the event message to be transmitted to the subscription manager 480. As described above, the events occur and/or are generated and/or performed by one or more the services 490. Upon occurrence of the event, the one or more of the services 490 associated with the event notifies the event broker 430 which responds by notifying the subscription manager processor 512 via the subscription manager communicator 510.

Figure 5C:
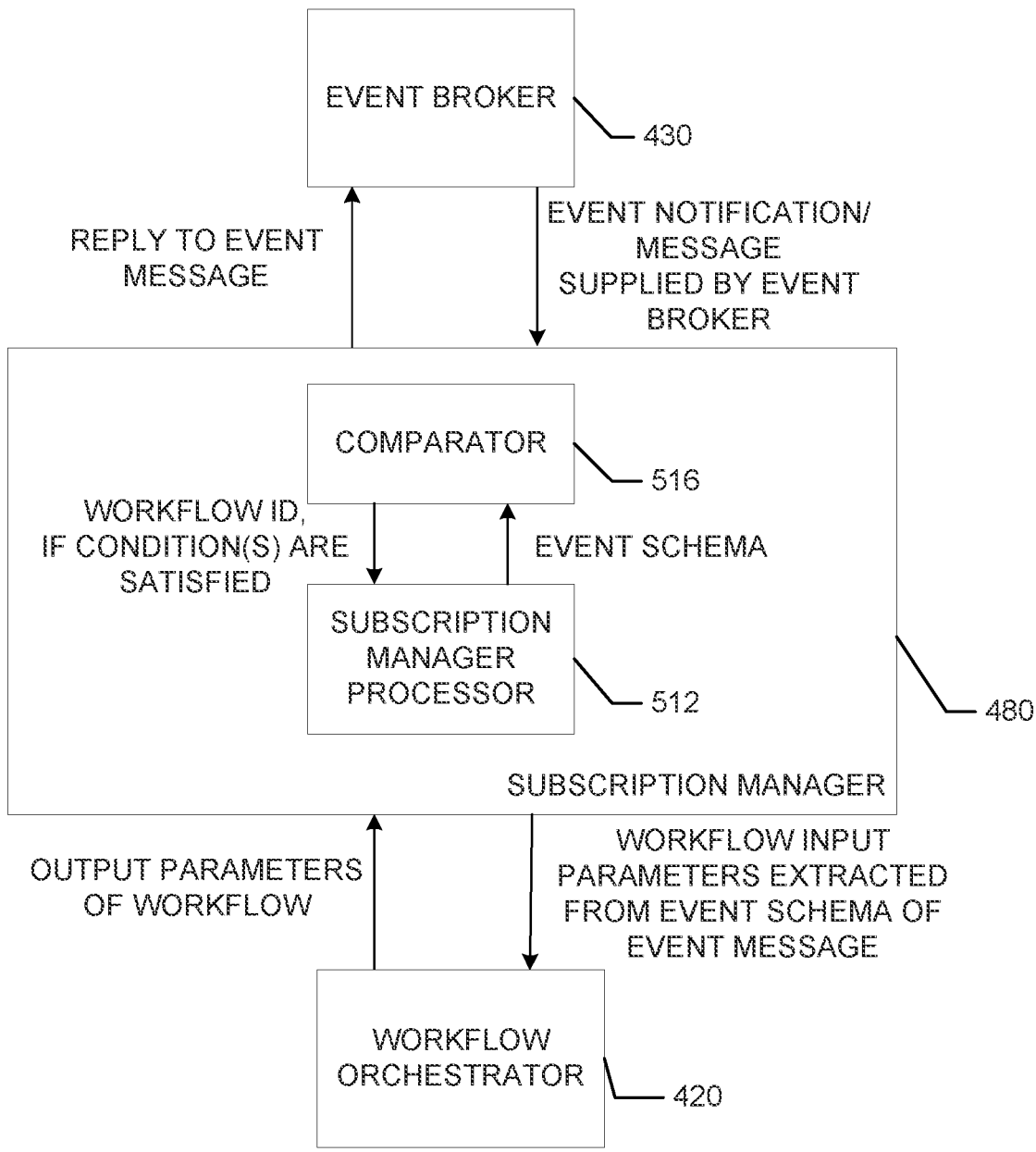
FIG. 5C is a block diagram illustrating an example exchange of information between the example subscription manager of FIG. 5A, the example event broker of FIG. 4, and the example orchestrator also shown in FIG. 4.

A block diagram illustrating an example exchange of information between the example event broker 430 (see FIG. 4), the example subscription manager processor 520, the example comparator 516, and the example orchestrator 420 (see FIG. 4) is shown in FIG. 5C. Although not shown in FIG. 5C, all communication to the example subscription manager 480 is received at the subscription manager communicator 510 for subsequent transmission to the example subscription manager processor 512 and information transmitted out of the subscription manager 480 is transmitted via the example subscription manager communicator 510. In some such examples, the event notification/message includes an event payload that identifies the event topic associated with the event notification (e.g. the event of interest) and includes event schema information. In some examples, upon receiving the event schema information, the subscription manager processor 512 causes the event schema information to be transmitted to the example comparator 516. The comparator 516 uses the event schema information to identify the event of interest and compares the event of interest to the event identifying information stored in the example second register 514B. If there is a match, thereby indicating that the event notification relates to the event of interest for the subscription, the comparator 516 compares the condition of interest stored in the example fourth register 514D to the event schema. Upon identifying the condition interest in the event schema, the comparator 516 compares a value corresponding to the condition of interest in the event schema to the threshold value stored in the example fifth register 514E of the subscription using the operator (also stored in the fifth register 514E). If the comparison indicates the condition has been met (and/or satisfied), the comparator 516 responds by obtaining the workflow identifier stored in the example third register 514C and causes the subscription manager processor 512 to transmit the workflow identifier to the orchestrator 420 via the subscription manager communicator 510. (As described with reference to FIG. 5B), the subscription manager processor 512 may additionally cause any input parameters (extracted from, for example, the event schema) to be supplied to the orchestrator 420 for use in executing the identified workflow. The orchestrator 420 uses the workflow identifier (and, if appropriate, input parameters) to execute the workflow 420. In some examples, the workflow identifier indicates that a specialized workflow is to be executed. The specialized workflow can be a workflow containing tasks and/or steps embodied in and/or corresponding to an executable script that the tenant administrator entered at the tenant administrator work station 116 (see FIG. 1). When this occurs, the subscription manager processor 512 can cause a storage address of the data storage 460 at which the script is stored to be transmitted to the workflow orchestrator 420. In some such examples, the workflow orchestrator responds by executing the tasks/steps contained at the storage address of the data storage 460. In some examples, upon completion of the workflow, the workflow orchestrator 420 can notify the subscription manager processor 512 by way of the subscription manager communicator 510. The subscription manager processor 512 can respond to the notification by notifying the event broker 430. In some examples the notification transmitted to the event broker 430 can include information about any aspect of the subscription and/or about execution of the workflow.

In some examples, more than one condition can be included in the subscription information. When more than one condition is included in the subscription information, the trigger of the workflow can be based on all, any, or none of the conditions being met and/or satisfied. In some such examples, the template includes an option by which the tenant administrator can select whether all, any, or none of the conditions are to be met and/or satisfied.

In some examples, the tenant administrator can use the template displayed via the example tenant administrator work station 116 (see FIG. 1) to make an active subscription inactive. In some such examples, the template includes a list of all subscriptions, both inactive and active, and the tenant administrator unchecks a check box, selects an inactive selection from a drop down menu, deselects a radial button, etc., associated with the subscription to be deactivated. Inactivating a selected subscription via the template causes the data collector 504 to transmit a subscription identifier identifying the selected subscription to the subscription manager 480 by way of the workflow subscription GUI communicator 506. In addition to sending the subscription identifier, an inactivation notification is also transmitted. In response, the subscription manager processor 512 causes the flag/bit stored in 514A of the selected subscription (e.g., subscription no. 1) to be unset. Because the flag/bit stored in 514A is no longer set, any future event notifications/messages received for the event associated with subscription no. 1 will have no effect on triggering the workflow identified in subscription no. 1.

By way of example, Table 1 illustrates an example provisioning event topic schema. In this example, the provisioning event topic schema is related to the provisioning of a virtual machine. In the illustrated example, the machine is identified using an identifier, "id," a machine name, a machine identifier on the hypervisor, a machine owner, and a machine type. As illustrated, the machine can be a physical machine or a virtual machine and includes a set of properties. The machine properties can include a blueprint name, a component identifier, a component type identifier, an endpoint identifier, a request identifier and a lifecycle state that indicates a state, phase and event. In addition, the event schema includes a virtual machine event field, a workflow next state field, a virtual machine add or update properties field and a virtual machine delete properties field.

TABLE 1

Example Provisioning Event Topic Schema

```
{
   machine : {
      id                    : STRING,      /* IaaS machine ID */
      name                  : STRING,      /* machine name */
      external Reference    : STRING,      /* machine ID on the hypervisor */
      owner                 : STRING,      /* machine owner */
      type                  : INTEGER,     /* machine type: 0-virtual machine; 1-physical machine: 2-cloud machine */
      properties            : Properties   /* machine properties, see notes below how to expose virtual machine properties */
   },
   blueprintName    : STRING,    /* blueprint name*/
   componentId      : STRING,    /* component id */
   componentTypeId  : STRING,    /* component type id */
   endpointId       : STRING,    /* endpoint id */
   requestid        : STRING,    /* request id */
   lifecyclestate   :{
                      /* see Life Cycle State Definitions*/
      state : STRING,
      phase : STRING,
      event : STRING
   },
   virtualMachineEvent                          : STRING,      /* fire an event on that machine-only processed by Manager Service as consumer */
   workflowNextState                            : STRING,      /* force the workflow to a specific state-only processed by Manager Service as consumer */
   virtualMachineAddOrUpdateProperties          : Properties,  /* properties on the machine to add/update-only processed by Manager Service as consumer */
   virtualMachineDeleteProperties               : Properties   /* properties to remove from the machine-only processed by Manager Service as consumer */
}
```

Based on the foregoing description, the example workflow subscription service implemented by the example vA 320 provides features that permit workflows to be triggered/executed based on a combination of events and user-selected/user-specified conditions that are identified using the example workflow subscription GUI 470. In previously available systems, a system administrator would be required to have an in-depth understanding of the workflow tasks and ordering of such tasks in order to perform the same workflow-triggering operations that are available using the workflow subscription GUI 470. For example, the system administrator would be required to identify stubs in a workflow and manually modify the existing workflow to enable the triggering of additional workflow tasks. Further, when the additional workflow tasks were no longer needed, the system administrator would be required to go back to the originally added tasks and remove all of the additional code needed to enable the additional tasks. The workflow subscription system disclosed herein enables the triggering of additional workflow/workflow tasks by making selections via a graphical user interface. Further, the tenant administrator can make the triggering of the workflow contingent upon any number of conditions.

While an example manner of implementing a workflow subscription service in a cloud computing environment is illustrated in FIGS. 1-5, one or more of the elements, processes and/or devices illustrated in FIGS. 1-5 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example workflow subscription GUI 470, example subscription manager 480, example services 490, example template generator 502, example data collector 504, example workflow subscription GUI communicator 506, example subscription manager communicator 510, example subscription manager processor 512, example registers 514A—514E, example comparator 516, and/or, more generally, the example systems 100 and/or 300 of FIGS. 1-5 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example workflow subscription GUI 470, example subscription manager 480, example services 490, example template generator 502, example data collector 504, example workflow subscription GUI communicator 506, example subscription manager communicator 510, example subscription manager processor 512, example registers 514A—514E, example comparator 516, and/or, more generally, the example systems 100 and/or 300 of FIGS. 1-5 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example workflow subscription GUI 470, example subscription manager 480, example services 490, example template generator 502, example data collector 504, example workflow subscription GUI communicator 506, example subscription manager communicator 510, example subscription manager processor 512, example registers 514A—514E, example comparator 516, and/or, more generally, the example systems 100 and/or 300 of FIGS. 1-5 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example workflow subscription GUI 470, example subscription manager 480, example services 490, example template generator 502, example data collector 504, example workflow subscription GUI communicator 506, example subscription manager communicator 510, example subscription manager processor 512, example registers 514A—514E, example comparator 516, and/or, more generally, the example systems 100 and/or 300 of FIGS. 1-5 may include one or more elements, processes and/or devices in addition to, or instead of, those illustrated in FIGS. 1-5, and/or may include more than one of any or all of the illustrated elements, processes and devices.

Figure 6:
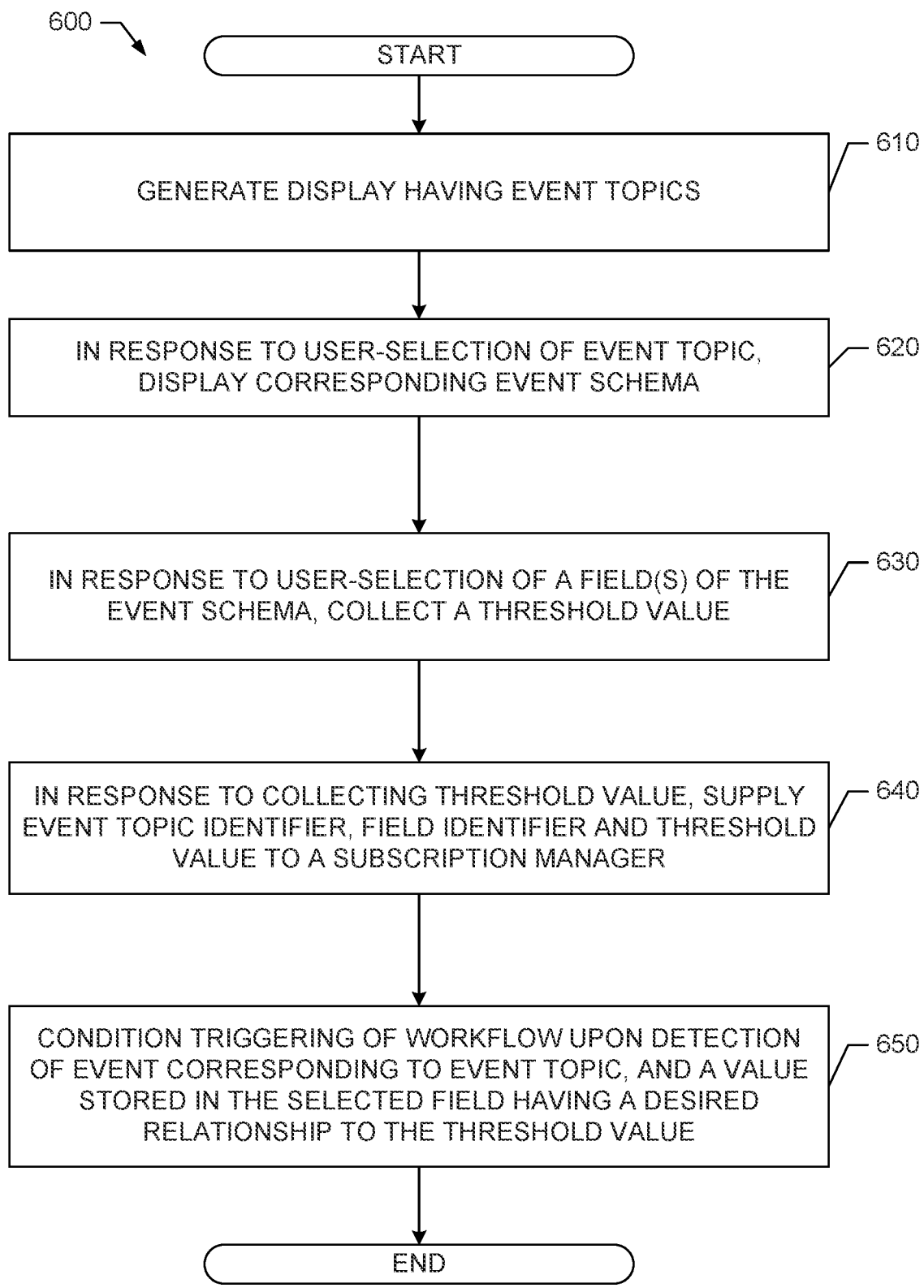
FIG. 6 is a flowchart representative of example computer readable instructions that may be executed to implement the example workflow subscription graphical user interface and the example subscription manager of the example virtual appliance of FIG. 4.
Figure 7:
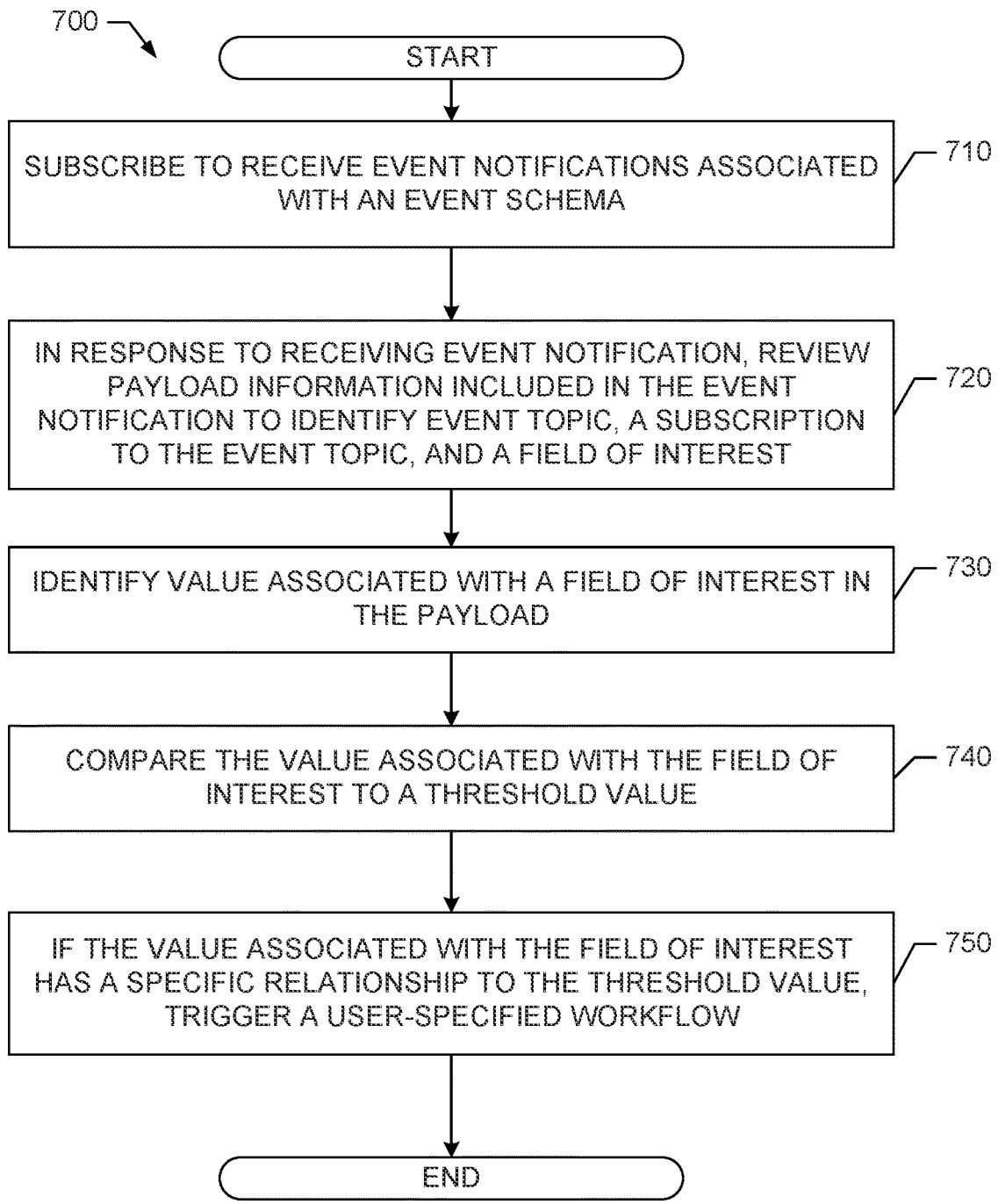
FIG. 7 is a flowchart representative of example computer readable instructions that may be executed to implement the example subscription manager of the example virtual appliance of FIG. 4.
Figure 8:
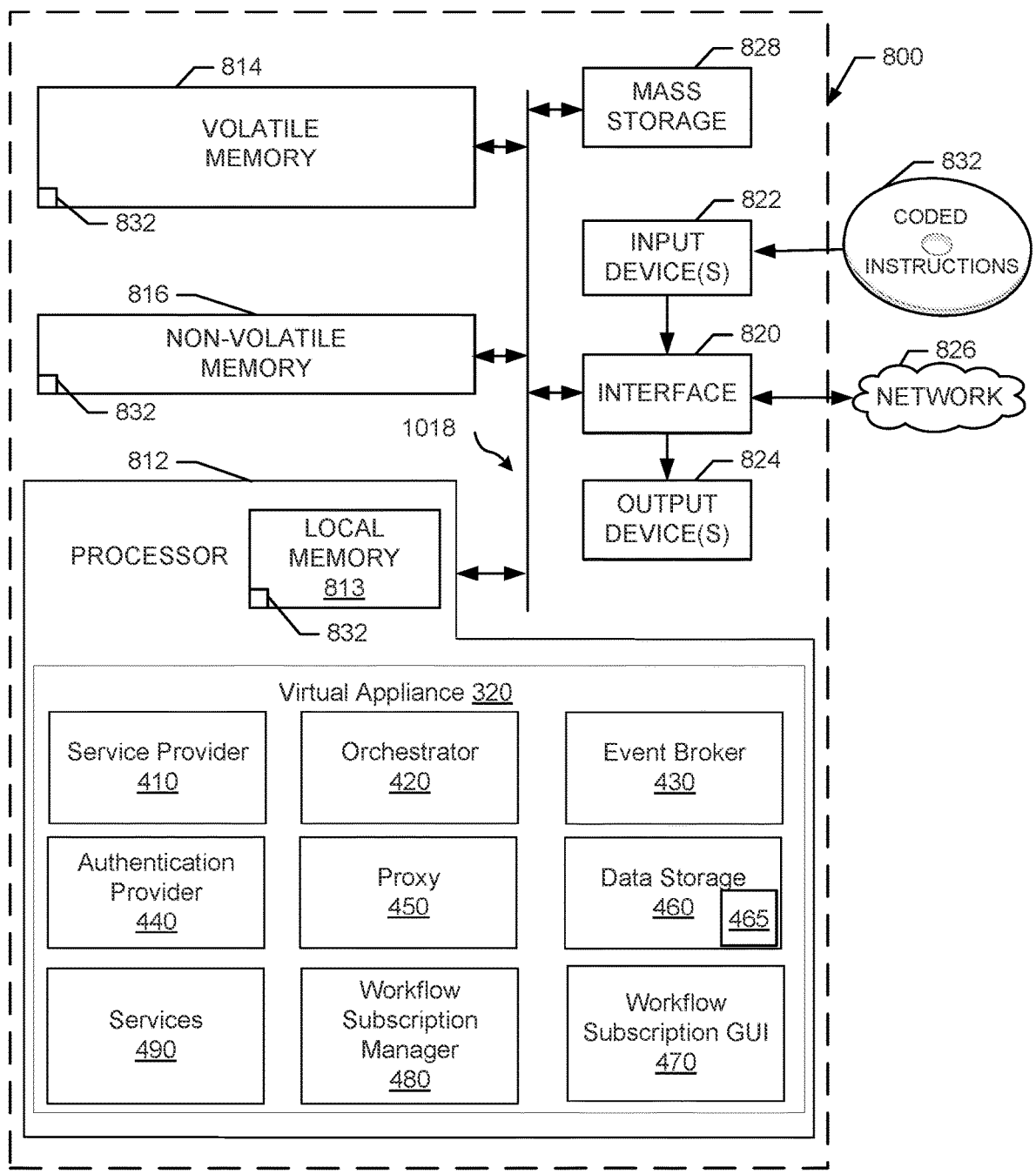
FIG. 8 is a block diagram of an example processing platform structured to execute the example computer readable instructions of FIGS. 6 and/or 7 and to implement the example virtual appliance of FIG. 4.

Flowcharts representative of example machine readable instructions that may be executed to implement the example virtual appliances 320, example service provisioner 410, example orchestrator 420, example event broker 430, example authentication provider 440, example internal reverse proxy 450, example data storage 460, example catalog 465, example workflow subscription GUI 470, example subscription manager 480, example services 490, example template generator 502, example data collector 504, example workflow subscription GUI communicator 506, example subscription manager communicator 510, example subscription manager processor 512, example registers 514A-514E, example comparator 516, and/or to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-5 are shown in FIGS. 6-8. In these examples, the machine readable instructions implement programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 6-8, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 6 depicts a flowchart representative of computer readable instructions that may be executed to implement the workflow subscription service using the example workflow subscription GUI 470 and the example subscription manager 480 of the example vA 320 of FIG. 4. An example program 600 is illustrated in FIG. 6. Initially, at block 610, the workflow subscription GUI 470 generates a display having event topics. At block 620, the workflow subscription GUI 470 responds to user-selection of an event topic by causing a corresponding event schema to be displayed. As described above, the event schema includes a set of fields. At block 630, the workflow subscription GUI 470 responds to user-selection of one of the fields of the event schema by collecting (from user-input) a threshold value. As further described above, the threshold value is a value that will be compared against a value associated with the selected field of the event schema. At block 640, the workflow subscription GUI 470 responds to the entry of the threshold value by supplying an event topic identifier identifying the selected event topic, a field identifier identifying the selected field and the threshold value to the subscription manager 480. In some examples, the workflow subscription GUI 470 causes the information to be stored in the example data storage 460 and then identifies a storage address of the information to the subscription manager 480. In some examples, the workflow subscription GUI 470 supplies the information directly to the subscription manager 480. In some examples, the workflow subscription GUI 470 causes the information to be stored in the data storage 460 and also supplies the information to the subscription manager 480. At block 650, the subscription manager causes the triggering of a user specified workflow to be conditioned upon the detection of an event notification corresponding to the user-selected event, and a value associated with the user-selected field of the event schema having a specified relationship (e.g., equal to, greater than, less than, etc.) to the threshold value. In some examples, the specified relationship is specified by the user via the display generated by the workflow subscription GUI 470. Thereafter, the program 600 ends.

FIG. 7 depicts a flowchart representative of computer readable instructions that may be executed to implement the workflow subscription service using the example subscription manager 480 of the example vA 320 of FIG. 4. An example program 700 is illustrated in FIG. 7. Initially, at block 710, the example subscription manager processor 512 of the subscription manager 480 transmits information via the example subscription manager communicator 510 to the example event broker 430. The transmitted information includes a subscription to a user selected event topic. At block 720, the subscription manager processor 512 responds to an event notification received from the event broker. In response to the event notification, the subscription manager processor 512 reviews the payload included in the received event notification to identify the event topic to which the event notification corresponds. Provided that at least one subscription managed by the subscription manager 480 is subscribed to the identified event topic, the subscription manager processor 512 identifies a field of interest included in the event payload. As further described above, the field of interest to be identified in the event payload can be stored in any of a set of registers 514A, 514B, 514C, 514D, 514E. At block 730, the subscription manager processor 512 identifies a value contained in the payload information in the field of interest. At block 740, the subscription manager processor 512 causes the example comparator 516 of the example subscription manager 480 to compare the value contained in the payload information in the field of interest with a threshold value stored in one of the registers 514A, 514B. 514C, 514D, 514E. At a block 750, provided that the value contained in the payload information in the field of interest bears a specific relationship (e.g., equal to, less than, greater than, etc.) to the threshold value, the subscription manager processor 512 causes a workflow to be triggered. Thereafter, the program 700 ends.

FIG. 8 is a block diagram of an example processor platform 800 structured to execute the instructions of FIGS. 6 and 7 to implement the example systems, operation, and management of FIGS. 1-5. The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache), and executes instructions to implement the example systems 100, 300 or portions thereof, such as the vA 320-324, component server 330-336, management endpoint 340-344, and management agent 350-356. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a keyboard, a button, a mouse, a touchscreen, a track-pad, a trackball, isopoint and/or a voice recognition system. In some examples, the input device(s) 822 are used to implement the tenant administrator work station 116 (see FIG. 1).

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor. In some examples the output device(s) 824 are used to implement the tenant administrator work station 116 (see FIG. 1).

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include flash devices, floppy disk drives, hard drive disks, optical compact disk (CD) drives, optical Blu-ray disk drives, RAID systems, and optical digital versatile disk (DVD) drives.

Coded instructions 832 representative of the example machine readable instructions of FIGS. 6 and 7 may be stored in the mass storage device 828, in the volatile memory 814, in the non-volatile memory 816, and/or on a removable tangible computer readable storage medium such as a CD or DVD.

In the example of FIG. 8, the processor 812 implements the virtual appliance 320 (and vAs 322-324) and the component server 330 (and servers 332-336) and their components including the service provisioner 410, orchestrator 420, event broker 430, authentication provider 440, proxy 450, data storage 460, subscription manager 480, the workflow subscription GUI 470, the services 490, catalog 465, etc. In certain examples, as discussed herein, the hardware of processor 812 is virtualized using virtualization such as VMs and/or containers. In the example of FIG. 8, the virtual appliance 320 can be implemented by one or more VMs or containers, so as to virtualize the hardware of processor 812.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to implement a virtual appliance in a cloud computing environment, the apparatus comprising:
at least one memory;
computer readable instructions; and
at least one processor to execute the computer readable instructions to at least:
cause a graphical user interface associated with the virtual appliance to be presented on a display device, the graphical user interface to present a template to create a first workflow subscription, the template to include (1) a first input element structured to specify a workflow to be performed and including a text field to accept a script to be executed to perform the workflow, and (2) a second input element structured to specify an event topic that is to trigger operation of the workflow, the second input element to include a field to specify at least one of (i) whether other workflow subscriptions are to be blocked from an event notification associated with the event topic until the first workflow subscription has acted upon the event notification, or (ii) whether a reply notification is to be sent to a service associated with the event notification after the workflow has completed in response to being triggered based on the event notification; and
trigger the workflow based on the first workflow subscription.

2. The apparatus of claim 1, wherein the template includes a third input element structured to specify a condition associated with the event topic and a value to be compared with the condition, the condition and the value to be evaluated to determine whether the workflow is to be triggered based on the event topic.

3. The apparatus of claim 2, wherein the condition includes at least one of an event type, an event timestamp or a user name.

4. The apparatus of claim 1, wherein the template includes a third input element structured to activate the first workflow subscription.

5. The apparatus of claim 1, wherein the second input element includes a list of selectable event topics.

6. The apparatus of claim 5, wherein the list of selectable event topics includes at least one of a post-approval event topic, a pre-approval event topic, an event log default event topic, a blueprint configuration event topic, a resource reclamation event topic, a business group configuration event topic, an orchestration server configuration event topic, a machine lifecycle event topic, or a machine provisioning event topic.

7. At least one non-transitory computer readable medium comprising computer readable instructions that, when executed, cause at least one processor to at least:
cause a graphical user interface associated with a virtual appliance in a cloud computing environment to be presented on a display device, the graphical user interface to present a template to create a first workflow subscription, the template to include (1) a first input element structured to specify a workflow to be performed and including a text field to accept a script to be executed to perform the workflow, and (2) a second input element structured to specify an event topic that is to trigger operation of the workflow, the second input element to include a field to specify at least one of (i) whether other workflow subscriptions are to be blocked from an event notification associated with the event topic until the first workflow subscription has acted upon the event notification, or (ii) whether a reply notification is to be sent to a service associated with the event notification after the workflow has completed in response to being triggered based on the event notification; and
trigger the workflow based on the first workflow subscription.

8. The non-transitory computer readable medium of claim 7, wherein the template includes a third input element structured to specify a condition associated with the event topic and a value to be compared with the condition, the condition and the value to be evaluated to determine whether the workflow is to be triggered based on the event topic.

9. The non-transitory computer readable medium of claim 8, wherein the condition includes at least one of an event type, an event timestamp or a user name.

10. The non-transitory computer readable medium of claim 7, wherein the template includes a third input element structured to activate the first workflow subscription.

11. The non-transitory computer readable medium of claim 7, wherein the second input element includes a list of selectable event topics.

12. The non-transitory computer readable medium of claim 11, wherein the list of selectable event topics includes at least one of a post-approval event topic, a pre-approval event topic, an event log default event topic, a blueprint configuration event topic, a resource reclamation event topic, a business group configuration event topic, an orchestration server configuration event topic, a machine lifecycle event topic, or a machine provisioning event topic.

13. A method for a virtual appliance in a cloud computing environment, the method comprising:
causing, by executing an instruction with at least one processor, a graphical user interface associated with the virtual appliance to be presented on a display device, the graphical user interface to present a template to create a first workflow subscription, the template to include (1) a first input element structured to specify a workflow to be performed and including a text field to accept a script to be executed to perform the workflow, and (2) a second input element structured to specify an event topic that is to trigger operation of the workflow, the second input element to include a field to specify at least one of (i) whether other workflow subscriptions are to be blocked from an event notification associated with the event topic until the first workflow subscription has acted upon the event notification, or (ii) whether a reply notification is to be sent to a service associated with the event notification after the workflow has completed in response to being triggered based on the event notification; and
triggering, by executing an instruction with the at least one processor, the workflow based on the first workflow subscription.

14. The method of claim 13, wherein the template includes a third input element structured to specify a condition associated with the event topic and a value to be compared with the condition, the condition and the value to be evaluated to determine whether the workflow is to be triggered based on the event topic.

15. The method of claim 14, wherein the condition includes at least one of an event type, an event timestamp or a user name.

16. The method of claim 13, wherein the template includes a third input element structured to activate the first workflow subscription.

17. The method of claim 13, wherein the second input element includes a list of selectable event topics.

18. The method of claim 17, wherein the list of selectable event topics includes at least one of a post-approval event topic, a pre-approval event topic, an event log default event topic, a blueprint configuration event topic, a resource reclamation event topic, a business group configuration event topic, an orchestration server configuration event topic, a machine lifecycle event topic, or a machine provisioning event topic.

* * * * *